United States Patent [19]

Holzapfel

[11] Patent Number: 5,332,896
[45] Date of Patent: Jul. 26, 1994

[54] INSTRUMENT FOR PRODUCING HARMONICS-FREE PERIODIC SIGNALS

[75] Inventor: Wolfgang Holzapfel, Obing, Fed. Rep. of Germany

[73] Assignee: Dr. Johanness Heidenhain GmbH, Fed. Rep. of Germany

[21] Appl. No.: 884,484

[22] Filed: Nov. 4, 1992

[30] Foreign Application Priority Data

Nov. 4, 1991 [EP] European Pat. Off. ........ 91118747.4

[51] Int. Cl.⁵ .............................................. H01J 3/14
[52] U.S. Cl. ............................ 250/237 G; 250/231.16
[58] Field of Search ............ 250/237 G, 227.11, 559, 250/560, 550, 231.16; 356/334, 395

[56] References Cited

U.S. PATENT DOCUMENTS

| | | | |
|---|---|---|---|
| 3,674,372 | 7/1972 | Weyrauch | 250/237 G |
| 4,176,276 | 11/1979 | Kaul et al. | 250/237 G |
| 4,225,931 | 9/1980 | Schwefel | 364/577 |
| 4,595,941 | 6/1986 | Avery | 351/43 |
| 4,602,436 | 7/1986 | Ernst | 250/237 G |
| 4,667,096 | 5/1987 | Dangschat | 250/231 SE |
| 4,782,229 | 11/1988 | Ernst | 250/237 G |
| 5,009,506 | 4/1991 | Spies | 250/237 G |

FOREIGN PATENT DOCUMENTS

| | | |
|---|---|---|
| 1941731 | 11/1973 | Fed. Rep. of Germany . |
| 2729697 | 1/1979 | Fed. Rep. of Germany . |
| 3412128 | 5/1985 | Fed. Rep. of Germany . |
| 3239108 | 7/1988 | Fed. Rep. of Germany . |
| 2116313 | 9/1983 | United Kingdom . |

OTHER PUBLICATIONS

Abstract of Japanese application JP62225911, Patent Abstracts of Japan, vol. 012090, Mar. 24, 1988. p. 1/1.

Primary Examiner—Edward P. Westin
Assistant Examiner—T. Davenport
Attorney, Agent, or Firm—Willian Brinks Hofer Gilson & Lione

[57] ABSTRACT

An instrument for obtaining harmonics-free signals with the aid of a periodic measurement graduation and a nonperiodic scanning graduation, wherein the centers of scanning graduation markings are staggered in accordance with a modified arcsin function.

15 Claims, 3 Drawing Sheets

Fig. 3
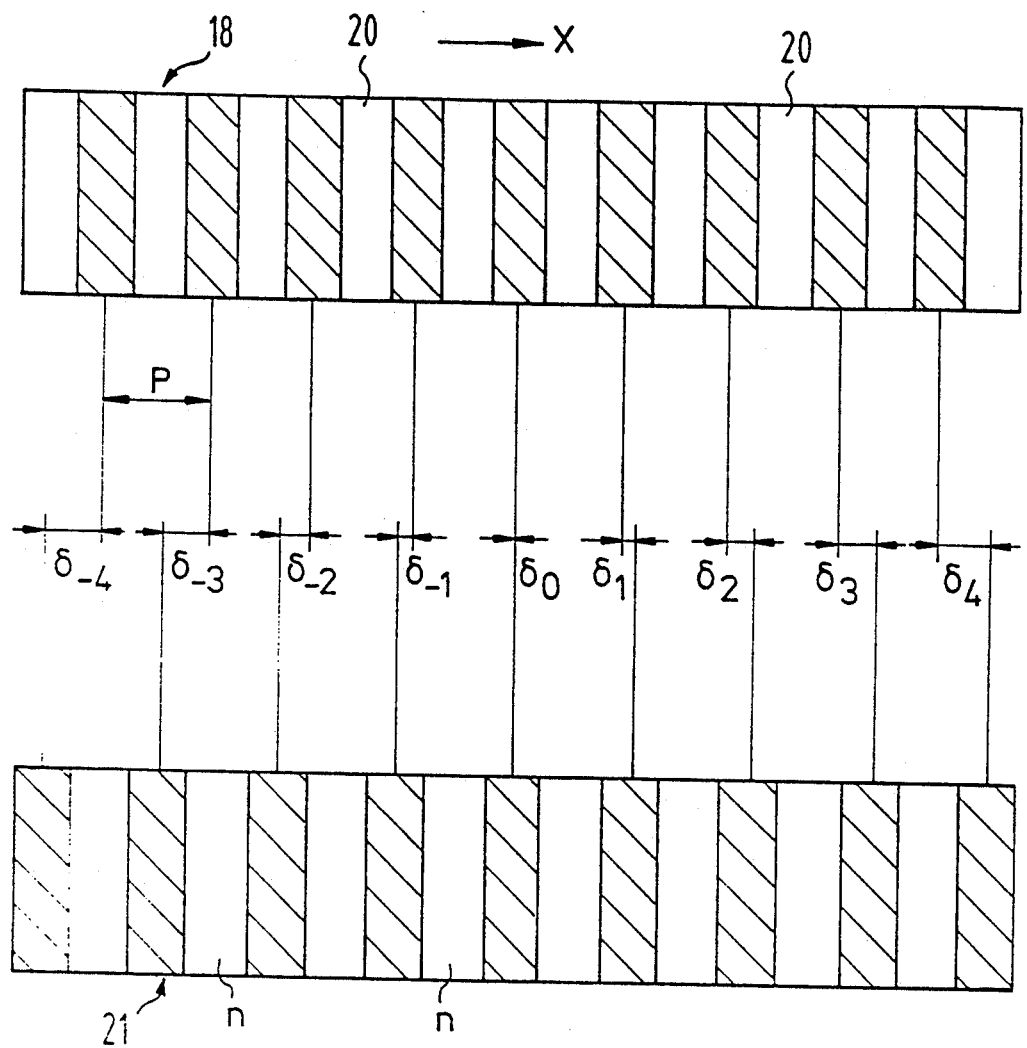
Fig. 4
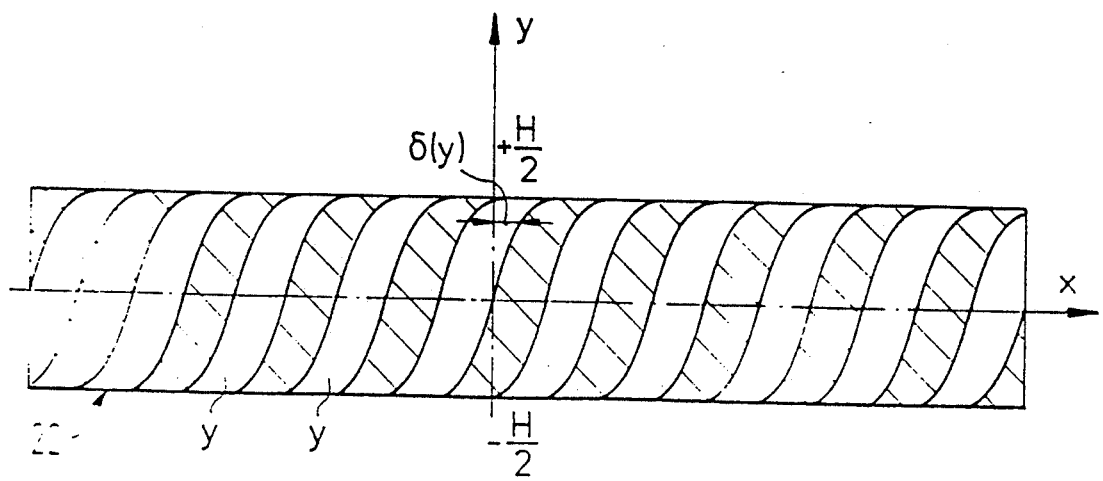
Fig. 5

INSTRUMENT FOR PRODUCING HARMONICS-FREE PERIODIC SIGNALS

Applicant claims, under 35 U.S. C. §119, the benefit of priority of the filling date of Nov. 4, 1991, of a European application, copy attached, Ser. No. 91118747.4, filed on the aforementioned date, the entire contents of which are incorporated herein by reference.

FIELD OF THE INVENTION

The invention relates to an instrument for obtaining harmonics-free signals up to a predetermined bandwidth that are generated by scanning a periodic measurement graduation having a scanning graduation with at least one scanning graduation marking; if there is more than one scanning graduation marking, the graduation markings are nonperiodically offset from one another.

BACKGROUND OF THE INVENTION

The present invention is directed to instruments used to measure positional changes of two objects that are movable relative to one another, using quite varied physical scanning principles. A distinction is made between photoelectric, magnetic, inductive and capacitive scanning. The basic principle is the same for all the methods, however, wherein a periodic measuring graduation is scanned, and the scanning signal thus generated is evaluated as a measurement signal.

The period of the scanning signals obtained is determined by the period or increment of graduation of a graduation-bearing substrate. In photoelectric measuring instruments, the increment is determined by the width of a transparent strip and an opaque strip in the measuring direction. Upon the relative motion between a scanning unit and the measurement graduation of the graduation-bearing substrate, one counting pulse is derived from each scanned increment and added together with the correct algebraic sign, and the sum is available as a measured value.

The periodic analog signals obtained from the graduations of the graduation-bearing substrate in photoelectric, magnetic, inductive and capacitive measuring instruments generally do not have a purely sinusoidal form; instead, they include harmonics, resulting for example from inaccuracies in the graduations. These graduation inaccuracies result from different spacings of the transparent and opaque strips, for instance, or from a lack of sharpness at the edges of these strips. To keep the analog signals obtained predominantly free of harmonics, stringent demands for accuracy of the graduations must be made. If accurate position measurement values for each graduation period are to be made, and if exact subdivision of the graduation periods by forming interpolated values are to be possible in order to increase the resolution further, then the analog signal obtained from this graduation must be free of harmonics. The formation of subdivisions through interpolated values derived by means of a computer, for instance, is described in German Published, Non-Examined Patent Application DE- OS 27 29 697.

Measuring instruments are also known that furnish triangular or trapezoidal analog signals, which intrinsically always include harmonics.

German Patent 19 41 731 discloses a photoelectric length measuring instrument, in which a frequency filter aperture with a sinusoidal shape of permeability is provided to obtain a harmonics-free analog signal when the graduation of a graduation-bearing substrate is scanned. In this measuring instrument, a special frequency filter aperture must be manufactured and installed. In addition, this measuring instrument is limited to the photoelectric transmitted-light measuring principle, in which a strip system made up of periodic fluctuations in brightness is generated, by the so-called vernier principle or moiré effect.

To obtain harmonics-free periodic signals, German Patent Disclosure 32 39 108 C2 proposes ascertaining the bandwidth (number of frequencies or waves) of the analog signal by scanning the period of the graduation with various scanning elements and subjecting the periodic analog signals furnished by the scanning elements to a Fourier analysis. Such a Fourier analysis allows one to ascertain Fourier coefficients of the fundamental of the analog signal, and evaluating the Fourier coefficients as harmonics-free periodic signals to form position measurement values.

A mathematically equivalent, but completely different embodiment of the principle of harmonics filtration is known as so-called arcsin scanning, disclosed in DE 34 12 128 C1. An intensity distribution (grating pattern in the shadow, or self-reproduction in the Talbot plane) is created by a first grating, and is scanned with a grating of variable graduation. The disadvantage is that the ideal distribution of the arcsin scanning graduation varies, depending on the total number of graduation lines.

OBJECT AND SUMMARY OF THE INVENTION

The object of the invention is to disclose an instrument for obtaining harmonics-free periodic signals that requires no additional elements for that purpose and is universally usable.

In addition, it should be possible to filter out not only all the integral harmonics but any subharmonics as well. This object is attained in accordance with the invention as disclosed hereinafter.

In particular, the advantages attained with the invention are that it allows one to simply obtain harmonics-free periodic signals merely with modified conventional means using known position measuring instruments, without requiring additional elements such as frequency filter apertures and without having to make special demands in terms of accuracy of the graduation.

Advantageous further features of the invention will become apparent from the ensuing detailed description of exemplary embodiments of the invention, taken in conjunction with the drawings.

BRIEF DESCRIPTION OF THE DRAWINGS

FIG. 3 shows an embodiment of a prior art scanning graduation with rectilinear periodic graduation markings without filter action;

FIG. 4 shows an embodiment of a nonperiodic scanning graduation with filter action according to the present invention;

FIG. 5, shows an embodiment of a periodic scanning graduation with a combination of vernier and arcsin filter action according to the present invention.

DESCRIPTION OF THE PREFERRED EMBODIMENTS

Figure 1:
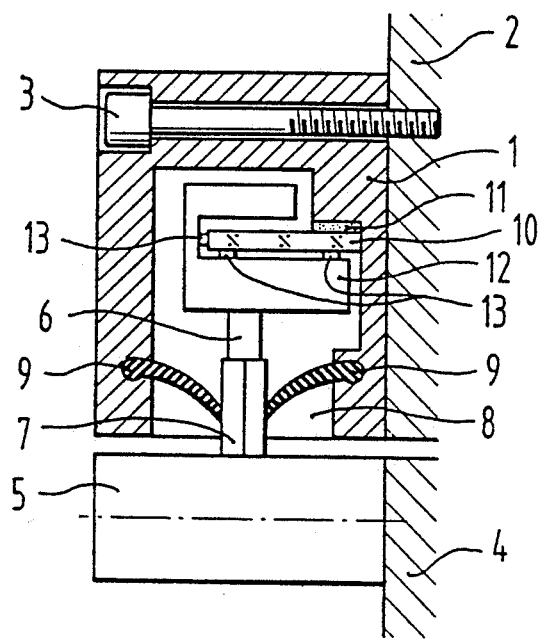
FIG. 1 shows a cross-section of an embodiment of a length measuring instrument according to the present invention.

FIG. 1 shows a length measuring instrument in cross section, whose housing 1, shown in a hollow profile, is secured to a bed 2 of a machining tool, not shown, by means of a screw connection 3. A mounting base 5 with a dog 6 is secured in an arbitrary way to a carriage 4. The base 5 protrudes, via a blade-like tapered portion 7 and dog 6 attached to portion 7, through a slit 8 into the otherwise completely closed housing 1. Elastic sealing lips 9 are provided in the slit 8 to prevent any entry of contaminants into the interior of the housing 1. A graduated scale 10 is attached to an inside face of the housing 1 by means of an elastic adhesive film 11, and a scanning unit 12 is supported on the scale 10 via rollers 13. The relative motion of the carriage 4 and the bed 2 is transmitted by the tapered portion 7 and dog 6 to the scanning unit 12.

Figure 2:
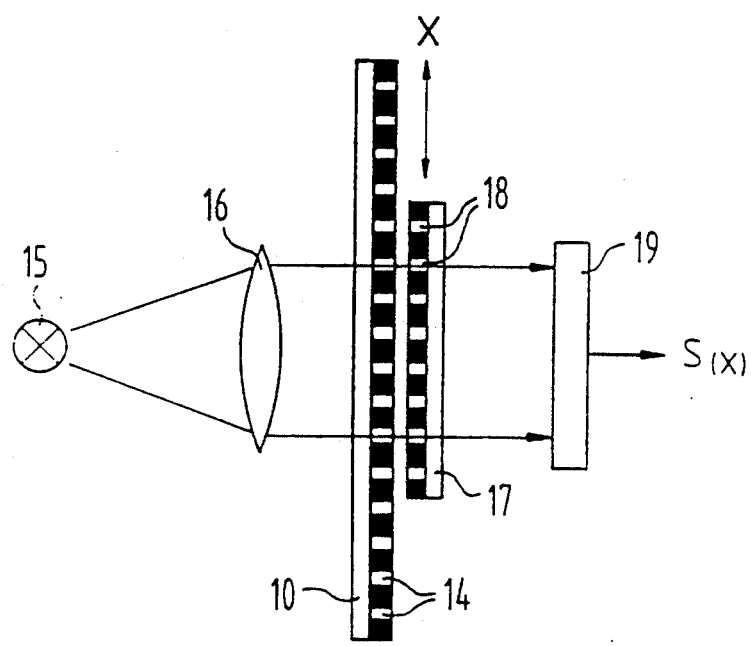
FIG. 2 schematically shows an embodiment of a scanning unit of a photoelectric length measuring instrument according to the present invention.

In FIG. 2 a photoelectric length measurement system is shown comprising a light source 15, a condenser or lens 16, a scanning plate 17 having graduations 18, and a photoelement 19 are disposed in the scanning unit 12 for scanning a graduation 14 of the graduated scale element 10. The stream of light originating from the light source 15 is oriented in a parallel direction by the condenser 16. The parallel light passes through the graduations 14, 18 of the graduated scale element 10 and the scanning plate 17, respectively, and finally strikes the photoelement 19. Upon the motion of the scanning unit 12 containing the scanning plate 17 in the measuring direction X relative to the fixed graduated scale element 10, the stream of light is modulated by the graduations 14, 18, so that the photoelement 19 furnishes a periodic electrical analog signal S (X), which is evaluated, counted and displayed in digital form as a position measurement value.

Because of inaccuracies of the graduations 14, 18, for instance, the periodic analog signal S(X) furnished by the photoelement 19 generally includes harmonics, and it can be represented by a Fourier series as a function of the measurement travel X.

A scanning graduation 18 shown in FIG. 3, with rectilinear periodic graduation markings 20, does not cause any suppression of harmonics. However, by rotating the scanning graduation 18 somewhat relative to the measurement graduation 14 having the same graduation period P as scanning graduation 18 creates a moiré or watered-silk pattern. This is understood to mean a strip system made up of periodic fluctuations in brightness, having a greater period length than the graduation period P of the measurement graduations 14 and scanning graduations 18. If detectors are associated in the correct position with respect to this moiré strip pattern, some of the harmonics, such as all the even-numbered ones, can be suppressed.

If the measurement graduation 14 and the scanning graduation 18 have different but periodic graduations having periods P and P', respectively, (in other words as in FIG. 3 once again), then a so-called vernier strip pattern is created, again with a larger period than the periods P and P' of the measurement and scanning graduations. Once again, some of the harmonics can be eliminated with suitably disposed detectors.

For harmonics suppression by the aforementioned arcsin function as disclosed in DE 34 12 128 C1, a nonperiodic scanning graduation is required. Such a scanning graduation comprises a plurality of individual graduation markings which are spaced from one another by spacings. The scanning graduation's individual graduation markings n (n = −N to +N) are each shifted by a small amount $\delta_n$ in the measurement direction X, compared with the rated position of a correspondingly associated individual measurement graduation marking of a periodic measurement graduation, as shown in FIGS. 3 and 4. The shift $\delta_n$ is derived from the following equation:

$$\delta_n = P/2\pi * \arcsin(n/N).$$

This method permits suppression of only the odd-numbered harmonics.

FIG. 4 schematically shows a nonperiodic scanning graduation 21 according to the present invention. Scanning graduation 21 comprises one or more rectangular scanning graduation markings n (n = −N to +N, +−N = the maximum number of markings located to the left (−) or right (+) of the central marking denoted n = 0) which are spaced from one another by rectangular spacings. Each of the scanning graduation markings have the same width. However, each graduation marking n is shifted by an amount $\delta_n$ (n = −N to +N) in the measurement direction X, compared with the rated position of a correspondingly associated individual measurement graduation marking of a periodic (Period = P) measurement graduation, as shown in FIGS. 3 and 4. The distinction between the prior art and this exemplary embodiment cannot be clearly shown in a drawing, because the variation in the graduation is performed by an inventive variation of the arcsin function.

Considered from a technical standpoint, the variation of the arcsin filtration according to the present invention comprises a combined vernier (or moiré) and arcsin filtration, which likewise results in a shift in the individual graduation markings n by amounts $\delta_n$ (n = −N to +N), which however deviate from the known arcsin shift.

A mathematical treatment of the filter action produces the following transcendental determination equations for the shift $\delta_n$, from which $\delta_n$ can be numerically calculated (see the diagram in FIG. 6):

1. For a scanning method with the signal period (SP) = graduation period (P) (Example: Talbot/shadow casting method) the following equation for $\delta_n$ is used to construct a scanning graduation to suppress all (integral) harmonics:

$$n/2N = \delta_n/P + \tfrac{1}{2}\pi * \sin(2\pi\delta_n/P)$$

2. For a scanning method with signal period (SP) = ½ graduation period (P) as employed for instance in triple-grating transducers operating interferentially the following equation for $\delta_n$ is used to construct a scanning graduation to suppress all integral and half-integral harmonics:

$$n/2N = \delta_n/P + \tfrac{1}{2}\pi * \sin(4\pi\delta_n/P)$$

A vernier filtration (linear increase in the shift of the graduation markings n on the scanning graduation 21) corresponds to the first term on the right-hand side of each of the equations, while an arcsin filtration corresponds to the second such term.

As a result of the particular type of combination of vernier and arcsin filtration, as contained in the above equations, a suppression of all the harmonics that occur can be attained.

In another embodiment of the present invention, it is also possible to attain an arcsin filtration by means of graduation markings y that are each identically curved in an arcsin fashion but are equidistant in the measuring direction X. This can be adopted for the combined vernier/arcsin filtration (see FIG. 5), which in this case is better described as a combined moiré/arcsin filtration.

As shown in FIG. 5, one embodiment of the present invention comprises scanning graduation 22 having one or more curved scanning graduation markings y which are spaced from one another by curved spacings. Scanning graduation has a width H as measured along the Y direction which is perpendicular to the measuring direction X. To describe the shape of scanning graduation markings y, the X axis is located so as to bisect scanning graduation 22. For measurement purposes, the Y axis is located at each point of the scanning graduation marking y which intersects the X axis, as shown in FIG. 5.

The displacement $\delta(Y)$ along the X direction of an edge of the scanning graduation marking as measured from the Y axis for a particular value of Y for a scanning method with the signal period (SP)=graduation period (P) is determined as follows:

$$Y/H = \delta(Y)/P + \tfrac{1}{2}\pi * \sin(2\pi\delta(Y)/P)$$

Furthermore, for a scanning method with signal period (SP)=½ graduation period (P) as employed for instance in three-grating transducers operating interferentially the value for the displacement for $\delta(Y)$ is as follows:

$$Y/H = \delta(Y)/P + \tfrac{1}{2}\pi * \sin(4\pi\delta(Y)/P)$$

In these equations, H is the length of the graduation markings y at right angles to the measuring direction X (see FIG. 5). Furthermore, each of the above described graduations 22 are periodic in that each point of a graduation marking y has the same spacing from a corresponding point of an adjacent graduation marking.

Since in this case the graduation is periodic, the measuring graduation may also be embodied in this form (instead of the scanning graduation 22).

Figure 6:
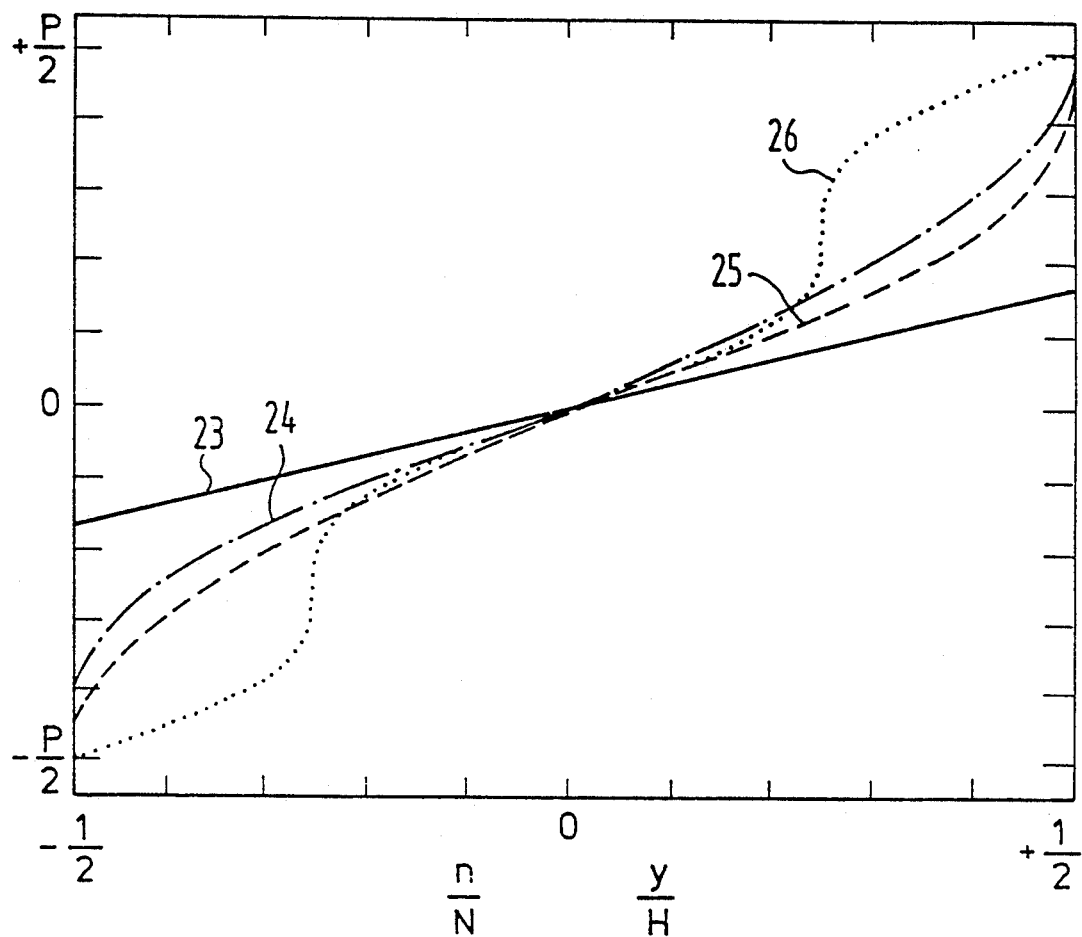
FIG. 6 is a diagram comparing prior art harmonics filtration with the harmonics filtration of the embodiments of the present invention shown in FIGS. 4 and 5.

In the diagram of FIG. 6, the form of the filtration is shown in the various curves. Curve 23 shown in solid lines represents the conventional vernier or moiré filtration. The dot-dash curve 24 represents the arcsin filtration, with an identical signal and graduation period SP and P, respectively. The dashed-line curve 25 represents the combined vernier/arcsin filtration, specifically when the signal period SP is equal to the graduation period P of the measurement graduation 14. The curve shown in dotted lines 26 represents the course of the combined vernier/arcsin filtration if the signal period SP is equivalent to a one-half graduation period P/2.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. An instrument for obtaining harmonics-free signals up to a predeterminable bandwidth, comprising:
   a periodic measurement graduation comprising a plurality of periodically spaced measurement graduation markings;
   a scanning graduation comprising one or more scanning graduation markings which are offset from one another nonperiodically, such that the spacing of the scanning graduation marking centers is staggered by a modified arcsin function.

2. The instrument of claim 1, wherein said scanning graduation markings have the same width.

3. The instrument of claim 1, comprising a scanning unit to move said scanning graduation relative to said measurement graduation along a scanning direction X.

4. The instrument of claim 1, wherein said scanning graduation marking centers are offset from a corresponding measurement graduation marking center by an amount determined by a modified arcsin function.

5. The instrument of claim 3, wherein said scanning graduation marking centers are offset along said scanning direction X from a corresponding measurement graduation marking center by an amount determined by a modified arcsin function.

6. The instrument of claim 5, wherein the nth scanning graduation marking center is offset along said scanning direction X by an amount $\delta_n$ which is determined by the formula:

$$n/2N = \delta_n/P + \tfrac{1}{2}\pi * \sin(2\pi\delta_n/P)$$

wherein n = −N to +N, +−N = the maximum number of markings located to the left (−) or right (+) of the central marking denoted n=0), and P is the period of said measurement graduation.

7. The instrument of claim 5, wherein the nth scanning graduation marking center is offset along said scanning direction X by an amount $\delta_n$ which is determined by the formula:

$$n/2N = \delta_n/P + \tfrac{1}{2}\pi * \sin(4\pi\delta_n/P)$$

wherein n = −N to +N, +−N = the maximum number of markings located to the left (−) or right (+) of the central marking denoted n=0), and P is the period of said measurement graduation.

8. An instrument for obtaining harmonics-free signals up to a predeterminable bandwidth, comprising:
   a periodic measurement graduation comprising a plurality of periodically spaced measurement graduation markings;
   a scanning graduation comprising one or more scanning graduation markings which are shaped in accordance with a modified arcsin function.

9. The instrument of claim 8, wherein said scanning graduation markings are periodically spaced from one another.

10. The instrument of claim 8, comprising a scanning unit to move said scanning graduation relative to said measurement graduation along a scanning direction X.

11. The instrument of claim 10, wherein said scanning graduation markings are periodically spaced from one another along said scanning direction X.

12. The instrument of claim 9, wherein said period of spacing of said scanning graduation markings corresponds to the period of spacing of said measurement graduation markings.

13. The instrument of claim 11, wherein said period of spacing of said scanning graduation markings corresponds to the period of spacing of said measurement graduation markings.

14. The instrument of claim 11, wherein each scanning graduation marking has a shape determined by the term δ(Y) which corresponds to the distance an edge of said scanning graduation marking is from a Y axis which 1) is perpendicular to an X axis which bisects said scanning graduation along the measurement direction and 2) is located at each point of said scanning graduation marking which intersects said X axis, and wherein δ(Y) is determined by the formula:

$$Y/H = \delta(Y)/P + \tfrac{1}{2}\pi^* \sin(2\pi\delta(Y)/P)$$

wherein Y is the position along the Y axis at which distance δ(Y) is to be determined, H is the width of said scanning graduation as measured along the Y direction, and P is the period of said measurement graduation.

15. The instrument of claim 11, wherein each scanning graduation marking has a shape determined by the term δ(Y) which corresponds to the distance an edge of said scanning graduation marking is from a Y axis which 1) is perpendicular to an X axis which bisects said scanning graduation along the measurement direction and 2) is located at each point of said scanning graduation marking which intersects said X axis, and wherein δ(Y) is determined by the formula:

$$Y/H = \delta(Y)/P + \tfrac{1}{2}\pi^* \sin(4\pi\delta(Y)/P)$$

wherein Y is the position along the Y axis at which distance δ(Y) is to be determined, H is the width of said scanning graduation as measured along the Y direction, and P is the period of said measurement graduation.

* * * * *

UNITED STATES PATENT AND TRADEMARK OFFICE
CERTIFICATE OF CORRECTION

PATENT NO. : 5,332,896
DATED : July 26, 1994
INVENTOR(S) : Wolfgang Holzapfel

It is certified that error appears in the above-indentified patent and that said Letters Patent is hereby corrected as shown below:

Title page, item [73], Assignee: delete "Johanness" and substitute -- Johannes--.

Signed and Sealed this

Seventh Day of March, 1995

Attest:

BRUCE LEHMAN

*Attesting Officer*     *Commissioner of Patents and Trademarks*